Patented Jan. 26, 1926.

1,570,752

UNITED STATES PATENT OFFICE.

VICTOR LEFEBURE AND ANTHONY JAMES HAILWOOD, OF MANCHESTER, ENGLAND, ASSIGNORS TO BRITISH DYESTUFFS CORPORATION LIMITED, OF MANCHESTER, LANCASHIRE, ENGLAND.

COMPOUND FOR ACCELERATING THE VULCANIZATION OF CAOUTCHOUC.

No Drawing.  Application filed October 1, 1923.  Serial No. 666,031.

*To all whom it may concern:*

Be it known that we, VICTOR LEFEBURE and ANTHONY JAMES HAILWOOD, subjects of the King of England, and residents of Manchester, in the county of Lancashire, England, have invented certain new and useful Improvements in new Compounds for Accelerating the Vulcanization of Caoutchouc, of which the following is a specification.

In Letters Patent No. 1,157,177 Stanley John Peachey described the process of accelerating the vulcanization of rubber by adding paranitrosodimethylaniline or one of its homologues to the rubber sulphur mix and subsequently heating. This invention has proved to be of very great importance and none of the bodies recommended either before or since for accelerating the vulcanization of rubber appear to give such good results in many respects as does paranitrosodimethylaniline or its equivalents. Its application suffers, however, from the disadvantage that it is liable to stain the skin during handling of the rubber mixture and further that some persons who appear to be particularly susceptible to the action of nitrosodimethylaniline develop a rash when working with it.

We have discovered a new body produced by the interaction of one molecular proportion of paranitrosodimethylaniline with two proportions of β-naphthol, which can readily be prepared and which affords a means of applying paranitrosodimethylaniline or an equivalent body in the vulcanization process whilst substantially diminishing if not entirely avoiding the above disadvantages. The new product is a molecular compound and evinces the usual chemical properties of its components. It is usually a neutral gray color, varying somewhat with the circumstances of preparation. In the present invention it is not necessary that the interaction between the two components be complete; efficient materials can be obtained by merely grinding the two components together. The amount of combination which results depends upon the circumstances of grinding. Incidentally the new compound is less inflammable than paranitrosodimethylaniline which affords advantages in transportation and storage. Nitrosodimethylaniline has to be transported and stored in a paste for safety; the new product can be applied, transported and stored as a finely divided powder. The new product while quite stable is a molecular compound, or "compound of addition" readily dissociated into its constituents.

In pure rubber mixes the addition of β-naphthol appears to exert little or no effect on the rate of vulcanization, but the new compound of β-naphthol and paranitrosodimethylaniline has a distinctly greater effect than is accounted for by its content of paranitrosodimethylaniline.

The composition of the stable molecular compound of paranitrosodimethylaniline and β-naphthol was ascertained by treating an aqueous solution of nitrosodimethylaniline with β-naphthol. Upon adding one molecular proportion of β-naphthol to the solution, about one-half of the nitrosodimethylaniline is removed and only when two molecular proportions of β-naphthol are added is substantially the whole of the nitrosodimethylaniline combined with β-naphthol and precipitated. Whilst this method of preparing the new body shows its composition, it is unnecessary to use an aqueous solution for the preparation of the product, which can be obtained by grinding together the nitroso base and β-naphthol in the proportions of one molecule of the nitrosodimethylaniline body to two molecules of the β-naphthol when combination takes place with a small liberation of heat.

Also it is not absolutely necessary that the compound of paranitrosodimethylaniline and β-naphthol be prepared before the application to the rubber for if the two bodies be mixed and the mixture applied on the rolls some combination takes place and a similar result is obtained.

The nitroso body used should be of good quality. The naphthol compound made from an impure product is liable to decomposition even in the cold.

We do not recommend the use of α-naphthol instead of β-naphthol because it is liable to combine with the nitroso body yielding an indophenolic body, and although we recommend the use of the molecular compound containing the nitroso body and the naphthol in the proportions of one molecule to two it is to be understood that a mixture of this body with more naphthol or with more nitroso body can be employed if desired.

The following example will illustrate the manufacture of our new product:—

150 parts of pure, finely divided paranitrosodimethylaniline are mixed at ordinary temperature with 288 parts of pure, finely divided β-naphthol. Combination begins immediately, with slight development of heat and is complete in 2-3 hours if the mixing is perfectly intimate. The combination is noticeably accelerated if the intimate mixture is ground in a mill which exerts a slight mechanical pressure on the powder, as is done, for example, in an ordinary mortar. The completion of the combination is shown by the cessation of heat-development and also by the complete homogeneity of the product when viewed microscopically. The powder thus obtained is ready for use.

Instead of paranitrosodimethylaniline equivalent paranitrosodialkylarylamines can be used.

The new product can be applied in the vulcanization of rubber as follows:—

90 parts of rubber are mixed on the rolls with 7 parts of sulphur, 5 parts zinc oxide and 1 part of the new compound and after thoroughly mixing the mass is heated at 40 lbs. steam pressure for 20–30 minutes when the rubber will be found to be fully vulcanized, that is in less than one-third of the time required when an accelerator is not used.

We claim—

1. As a new product a stable molecular compound of one molecular proportion of paranitrosodialkyl-arylamine and two molecular proportions of β-naphthol.

2. As a new product a stable molecular compound of one molecular proportion of paranitrosodialkylaniline and two molecular proportions of the β-naphthol.

3. As a new product a stable molecular compound of one molecular proportion of paranitrosodimethylaniline and two molecular proportions of β-naphthol.

4. As a new product a stable molecular compound of one molecular proportion of paranitrosoalkyl-arylamine and two molecular proportions of β-naphthol.

In testimony whereof, we have hereunto affixed our signatures.

VICTOR LEFEBURE.
ANTHONY JAMES HAILWOOD.